UNITED STATES PATENT OFFICE.

WILHELM HERZBERG, OF BERLIN, AND HEINRICH OSTER, OF CHARLOTTENBURG, GERMANY, ASSIGNORS TO ACTIEN GESELLSCHAFT FÜR ANILIN FABRIKATION, OF BERLIN, GERMANY.

YELLOW MONOAZO DYESTUFF.

No. 906,422.　　　Specification of Letters Patent.　　　Patented Dec. 8, 1908.

Application filed June 3, 1908. Serial No. 436,459.

*To all whom it may concern:*

Be it known that we, WILHELM HERZBERG and HEINRICH OSTER, citizens of the German Empire, residing at Berlin and Charlottenburg 2, near Berlin, respectively, and whose post-office addresses are, respectively, Berlin, Hagelsbergerstrasse 10 c., and Charlottenburg 2, near Berlin, Guerickestrasse 14, Germany, have invented certain new and useful Improvements in New Yellow Monoazo Dyestuffs, of which the following is a specification.

We have found that very valuable monoazo-dyestuffs can be obtained by diazotizing and then combining a chloro-derivative of anilin, such as a mono- or poly-chloroanilin with 1.3-phenylenediamin-2.5-disulfonic acid; the coloring matters thus produced dye wool and silk without a mordant from an acid bath (sulfuric acid) clear and intense yellow shades which are fast to acids and alkalies and to light.

As to the 1.3-phenylenediamin-2.5-disulfonic acid this acid may be obtained by acting with sodium-sulfite on the 1.3-dinitro-2-chlorobenzene-5-sulfonic acid and reducing the 1.3-dinitrobenzene-2.5-disulfonic acid thus obtained.

The following example serves to illustrate our invention: 127 parts of ortho-chloroanilin are diazotized in the usual manner by means of 69 parts of sodium nitrite and 285 parts of hydrochloric acid (20—21° Bé.). The diazo-solution thus obtained is introduced while stirring well into an aqueous solution of 1.3-phenylenediamin-2.5-disulfonic acid; the combination occurs at once, the dyestuff separating to a great extent from the solution. When the reaction is finished, the mass is heated to the boil, the dyestuff thus being dissolved, whereafter from the hot solution the product is separated by adding common salt and is thus obtained in the shape of red crystals. This dyestuff dyes wool and silk from an acid bath (sulfuric acid) a clear and intense yellow shade which is fast to acids and alkalies and to light.

This new dyestuff as above separated from the combination forms when pulverized a red powder, dissolving in water to a yellow solution, which solution on addition of some concentrated hydrochloric acid becomes a little more reddish and which solution is not altered on the addition of some concentrated soda-lye. The dyestuff also dissolves in alcohol to a yellow solution and in concentrated sulfuric acid to a red solution, which when diluted with ice separates red flakes.

By the action of strong reducing agents the dyestuff is split up, ortho-chloroanilin besides triamidobenzene-disulfonic acid resulting.

If for the ortho-chloroanilin used in the foregoing example another monochloroanilin, a dichloroanilin or another polychloroanilin is substituted dyestuffs of similar properties are obtained.

It is obvious to those skilled in the art that when using other mono- or polychloro-derivatives of anilin as parent material to be diazotized and to be combined with the 1.3-phenylenediamin-2.5-disulfonic acid the conditions for diazotization and combination may be altered, such as the special character of the ingredients and of the product to be manufactured will require in order to obtain the best results.

Having now described our invention and the manner in which it may be performed what we claim is,—

1. As new articles of manufacture the monoazo-dyestuffs which can be obtained by diazotizing a chloro-derivative of anilin and combining the diazo-compound thus obtained with 1.3-phenylenediamin-2.5-disulfonic acid, which dyestuffs produce on wool and silk without a mordant from an acid bath clear and intense yellow shades which are fast to acids and alkalies and to light, and which coloring matters form when pulverized red powders, dissolving in water to a yellow solution, in concentrated sulfuric acid to a red solution and in alcohol to a yellow solution, and which new dyestuffs by the action of strong reducing agents are split up yielding a chloro-derivative of anilin besides triamidobenzene-disulfonic acid.

2. As a new article of manufacture the monoazo-dyestuffs which can be obtained by diazotizing ortho-chloroanilin and combining the diazo-compound thus obtained with 1.3-phenylenediamin-2.5-disulfonic acid, which dyestuff produces on wool and silk without a mordant from an acid bath clear and intense yellow shades which are fast to acids and alkalies and to light, and which coloring matter forms when pulverized a red powder, dissolving in water to a yellow solution which on the addition of some concentrated hydrochloric acid becomes a little more reddish, and which solution is not altered by the addition of some concentrated soda-lye, this dyestuff dissolving in concentrated sulfuric acid to a red solution, which when diluted with ice separates red flakes, and dissolving in alcohol to a yellow solution, and which dyestuff by the action of strong reducing agents yields ortho-chloroanilin besides triamidobenzene-disulfonic acid.

In testimony whereof we have hereunto set our hands in presence of two subscribing witnesses.

WILHELM HERZBERG.
HEINRICH OSTER.

Witnesses:
HENRY HASPER,
WOLDEMAR HAUPT.